United States Patent [19]

Shimizu et al.

[11] Patent Number: 4,818,321

[45] Date of Patent: Apr. 4, 1989

[54] PREPARATION OF LAMINATED MATERIAL

[75] Inventors: Shin Shimizu, Setagaya; Tsugane Tanaka, Mitaka; Osamu Ohara, Setagaya; Taisei Inoue, Funabashi, all of Japan

[73] Assignee: Koyo Sangyo Co., Ltd.

[21] Appl. No.: 57,288

[22] Filed: May 29, 1987

[30] Foreign Application Priority Data

Jun. 11, 1986 [JP] Japan .................................. 61-135516

[51] Int. Cl.[4] ............................................ B32B 31/18
[52] U.S. Cl. ..................................... 156/254; 156/256; 156/264; 144/333; 144/348; 144/352; 144/366
[58] Field of Search ................ 156/250, 254, 256, 264, 156/265; 144/329, 332, 333, 344, 346, 348, 352, 350, 351, 355, 359, 363, 366

[56] References Cited

U.S. PATENT DOCUMENTS

| | | | |
|---|---|---|---|
| 67,320 | 7/1867 | Klein | 144/333 |
| 1,645,812 | 10/1927 | Lane | 144/333 |
| 1,688,569 | 10/1928 | Wensel | 144/333 |
| 2,256,946 | 9/1941 | Hill | 144/333 |

Primary Examiner—Caleb Weston
Attorney, Agent, or Firm—Toren, McGeady & Associates

[57] ABSTRACT

A process for the preparation of a laminated material including the steps of cutting open an annual lignocellulosic stalk in the fiber direction with a knife; flattening the lignocellulosic stalk by means of a roller press to form a compressed stalk, one face of which consists of its epidermis; arrangement a plurality of the compressed stalks in parallel with each other to form a sheet; coating the sheet with a resin adhesive; stacking a plurality of the sheets coated with the adhesive; and then bonding with heat and pressure by means of a hot press. The laminated material in the form of boards has an equal to or higher flexural strength than conventional plywood or also has excellent sound absorbing and heat insulating properties in comparison with conventional particleboard or fiberboard.

7 Claims, 3 Drawing Sheets

PREPARATION OF LAMINATED MATERIAL

BACKGROUND OF THE INVENTION (1) Field of the Invention

The present invention relates to a method for the preparation of a laminated material mainly annual lignocellulosic stalks and a laminated material produced by the method, more particularly to a method for the preparation of a laminated material used for various building materials, such as heat insulating materials, sound absorbing materials, building materials for fixture, furniture materials or structural building materials and also for display materials or materials for handicrafts.

(2) Description of the Related Art

Building materials other than plywood and veneer include wood based materials, such as particleboard, fiberboard, and synthetic resin foam made of polystyrene or polyethylene.

Particleboard is made by combining wood chips and a synthetic resin adhesive mixture with heat and pressure. Fiberboard is made by compressing wood and other vegetable fibers. Particleboard and fiberboard do not suffer from aeolotropy in practical use and lack the shortcomings of natural materials, such as knots, rot, dimensional distortion, and warping. Furthermore, one can select the desired specific gravity, thickness, and size of these boards according to use. Synthetic resin foam, being light and having an excellent heat insulating property as well as good workability, is widely used as a heat insulating material in building construction.

However, because the main material of the above-mentioned wood based materials is natural wood, the supply is limited and may not be sufficient to meet demand in the future. Thus, there is a fear that wood based materials will become expensive. Furthermore, particleboard, fiberboard, and synthetic resin foam have low strength in comparison with materials like plywood. Even if made dense, they do not have the strength required for structural materials.

An object of this invention is to provide a method for the preparation of a laminated material based on cheap, abundant materials, i.e., annual lignocellulosic stalks.

Another object of this invention is to provide a method for the preparation of a laminated material having a strength equal to or higher than that of plywood on the market.

A further object of this invention is to provide a method for the preparation of a laminated material having high sound absorbing and heat insulating properties.

A still further object of this invention is to provide a method for the preparation of a laminated material from a low to high specific gravity.

An additional object of this invention is to provide a laminated material in the form of a board made by the method.

SUMMARY OF THE INVENTION

The present invention provides a process for the preparation of a laminated material which includes the steps of cutting open an annual lignocellulosic stalk in the fiber direction with cutting means; flattening the lignocellulosic stalk by means of a roller press at pressures of from 0.5 to 10 kg/cm$^2$ to form a compressed stalk, one face of which consists of its epidermis; arranging a plurality of compressed stalks in parallel with each other to form a sheet; coating the sheet with a resin adhesive; stacking a plurality of sheets coated with the adhesive; and then bonding with temperatures of from room temperature to 180° C. and pressures of from 5 to 30 kg/cm$^2$ by means of a hot press.

BRIEF DESCRIPTION OF THE DRAWINGS

These and other objects as well as advantages of this invention will become more apparent from the description of preferred embodiments of this invention with reference to the accompanying drawings, in which.

DESCRIPTION OF THE PREFERRED EMBODIMENT

Stalks of sorghum, sugar cane, or corn may be used as the lignocellulosic stalks in this invention. The stalks of sorghum are preferable.

Figure 1:
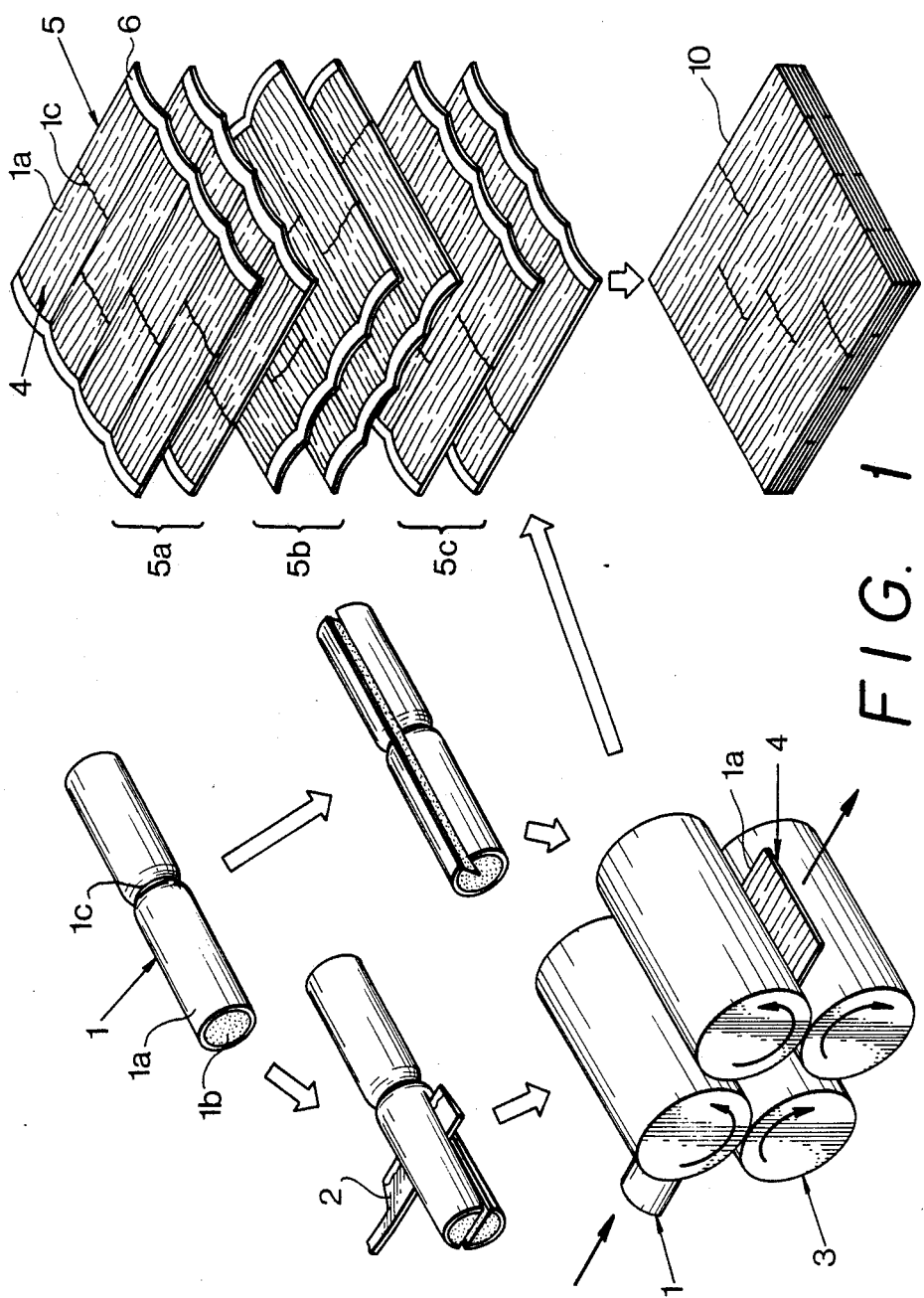
FIG. 1 illustrates a process of producing a laminated material according to this invention.

Referring to FIG. 1, an annual lignocellulosic stalk 1 consists of an epidermis 1$a$, a core 1$b$ and a node 1$c$. The stalk 1 is split or opened in the fiber direction with a knife 2 and then fed into a roller press 3 to increase bond strength, as mentioned later. The stalk 1 is compressed and flattened by the roller press 3 to form a compressed stalk 4, one face of which consists of the epidermis 1$a$. The lignocellulosic stalk may be cut open and flattened simultaneously by attaching a knife to the roller press, not shown.

The pressure of the roller press 3 applied to the stalk 1 is selected from 0.5 to 10 kg/cm$^2$ according to the kind of lignocellulosic stalk 1 or the desired specific gravity of the laminated material. A pressure less than 0.5 kg/cm$^2$ does not produce a sufficient compression effect, and a pressure more than 10 kg/cm$^2$ crushes the stalk 1 and makes it impossible to obtain a continuous material. The compression temperature may be room temperature. The stalk 1 is given a net-like surface and is compressed without being crushed by providing the surface of the roller press 3 with a spiral groove.

A sheet 5 is formed by arranging a plurality of compressed stalks 4 in parallel with each other. It is preferable to arrange the compressed stalks 4 so that the nodes 1$c$ do not adjoin each other. It is also preferable to provisionally fix the plurality of compressed stalks in place by applying an adhesive tape 6 to the two ends, coating the ends with a fibrous hot-melt adhesive, or sewing the ends together by machine. A sheet 5 with the epidermis sides of the compressed stalks 4 facing the same direction results in uniform bond strength, as mentioned later. Arrangement of the compressed stalks 4 without gaps gives the sheet 5 a higher density.

One or both faces of the sheet 5 are coated with one or more resin adhesives, which are selected from the group consisting of isocyanate adhesives, thermosetting adhesives, cold-setting adhesives, and water emulsion adhesives and which are applied to the sheet 5 singly or in mixtures. The isocyanate adhesives include polyisocyanate resins and self-emulsifying polyisocyanate resins. An isocyanate adhesive increases the bond strength. The thermosetting adhesives include phenolic resins, melamine resins, urea resins, and epoxy resins. The cold-setting adhesives include epoxy resins, polyurethane resins, water vinyl-urethane resins, phenol-vinyl acetate copolymer emulsions, and other condensation resins. The water emulsion adhesives include polyvinyl acetate resins, ethylene-vinyl acetate copolymer resins, styrene-butadiene copolymer resins, methyl methacrylate-butadiene copolymer resins, acrylic ester copolymer resins, acrylic ester-vinyl acetate copolymer resins, acrylonitrile-butadiene copolymer resins, and isoprene copolymer resins. The method for coating the adhesive may be any one of spray coating, curtain coating, roller coating, and dipping. The coating quantity of the adhesive is selected from the range of from 5 to 30 wt. % against 100 wt. % of the sheet.

Figure 3:
FIG. 3 is a front view illustrating one way of stacking sheets wherein the sheets are arranged with the compressed stalks in the same direction.
Figure 4:
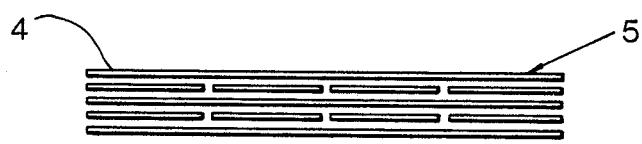
FIG. 4 is a front view illustrating another way of stacking sheets wherein the sheets are arranged with the compressed stalks perpendicular to stalks of adjoining sheets.

The sheets coated with the adhesive are stacked and then bonded with heat and pressure. The methods for stacking sheets are;

(a) stacking the sheets with the compressed stalks facing the same direction (See FIG. 3), (b) stacking the sheets with the compressed stalks of each sheet perpendicular to the stalks of adjoining sheets (See FIG. 4), and (c) stacking the sheets with the compressed stalks facing random directions (not shown).

The laminated material in method (a) has an extremely high flexural strength against the stalk direction. The laminated materials in methods (b) and (c) have higher flexural strength against the direction perpendicular to the stalk direction than that in method (a), but lower flexural strength against the stalk direction than that in method (a), and are resistant to warping. In method (a), it is preferable to arrange the sheet so the joints of the compressed stalks of one sheet are staggered from those of the stalks of the next sheet.

Figure 2:
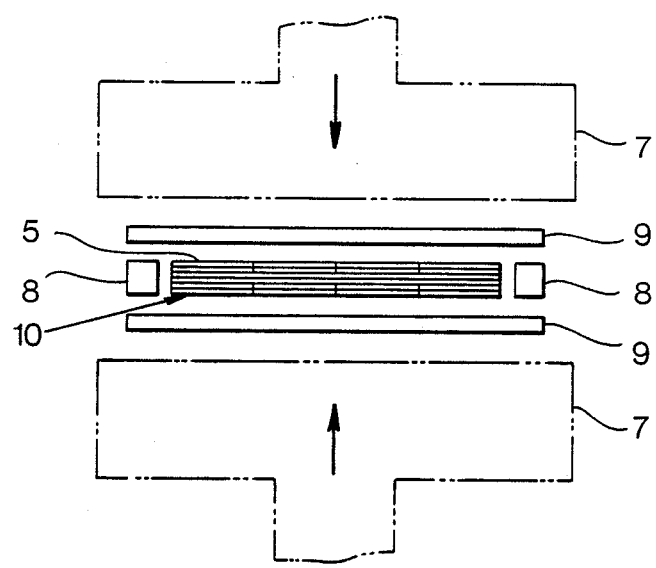
FIG. 2 illustrates a bond process.

The temperature and pressure conditions of the bond process are selected from the range of from room temperature to 180° C. and from the range of from 5 to 30 kg/cm$^2$, respectively, according to the adhesive used, the number of stacked sheets, and the desired specific gravity of the laminated material. As shown in FIG. 2, with a bond process using a hot press 7, spacers 8 having a specified thickness are preferably placed around the stacked sheets 5 to ensure the desired specific gravity and thickness. The two faces of the stacked sheets 5 are preferably sandwiched in between metal plates 9 in order to uniformly bond the sheets 5.

The characteristic point of this invention is that laminated material can be obtained in low specific gravity (0.3–0.4) to high specific gravity (0.8–1.0) according to the compression condition of the lignocellulosic stalks and the bond condition of the sheets, even with the same starting material. Laminated materials of low specific gravity (0.3–0.4), having high sound absorbing and heat insulating properties, are suited for sound absorbing materials or heat insulating materials. Laminated materials of medium specific gravity (0.5–0.7) are suited for building materials for fixture, furniture materials or structural building materials. Laminated materials of high specific gravity (0.8–1.0), having high strength, are suited for special structural building materials.

To prepare laminated materials with higher density and strength, the method is employed of using the stalk removing the core and using just the stalk, removing the wax component from the epidermis. These include mechanical methods and chemical methods. The removal of the core from the stalk or the removal of wax from the epidermis may be carried out before or after compressing lignocellulosic stalks. Because it is necessary to divide the lignocellulosic stalks in the fiber direction if the core is removed before compression, removal of the core after compression is preferable in work efficiency. Sandpapers, wire brushes, and knives may be used as the mechanical method for removing the core from the stalk and wax from the epidermis. Soakage in alkali water not less than pH 10, boiling water, or an organic solvent, such as benzene, acetone, or alcohol may be used as a chemical method.

Chemical treatment of the stalks before or after compression, such as flame retardation, moth-proofing, preservation, or dyeing, enhance the value of the laminated material. The sheet is thin, so chemical treatment can be easily carried out.

The laminated materials may be given wider application by attaching a face material like veneer to one or both faces of the stacked sheets or inserting it between the stacked sheets before bonding.

In the above-mentioned method, after or while being cut open in the fiber direction, an annual lignocellulosic stalk is opened up and flattened with moderate pressure without breaking the fiber composing the stalk, so that a long, continuous material becomes the base material. Consequently, the laminated material according to this invention has higher strength than conventional materials made by molding cut fibers, such as particleboard or fiberboard.

Particularly, the laminated material according to this invention may be given extremely high strength in comparison with conventional wood based materials by removing wax from the epidermis to increase the adhesive force or by removing the cores from the stalk so that the laminated material consists of only the fibrous part.

When the specific gravity of the laminated material is kept low by retaining the core of the stalk or by reducing the pressure of compression or bonding, many pores remain, so the laminated material becomes a net-like fibrous porous material and has high sound absorbing and heat insulating properties.

As described above, the laminated material of this invention can be stably supplied at low prices by utilizing as its material, lignocellulosic stalks, which exist globally in great abundance. There is the further advantage of solving the problem of disposal of such stalks.

Since fibers composing the stalks are not cut in this method, the laminated material has a strength equal to or higher than that of plywood on the market and can be used for structural building materials.

The present invention will be described more specifically referring to embodiments.

EXAMPLE 1

Twenty-four sorghum stalks of about 50 grams weight and 30 cm length were cut open in the fiber direction with a knife. The stalks were continuously fed into a grooved roller press and a non-grooved roller press for compression and flattening at ordinary temperature. The grooved roller press had a clearance of 1.5 mm between rolls and a groove 8 mm in pitch and 3 mm in depth. The non-grooved roller press had a clearance of 1.0 mm between rolls.

Groups of four compressed stalks were arranged in parallel with their epidermis sides up. The ends of these stalks were connected to each other by adhesive tape, in this way, six sheets were formed, each 1 mm×300 mm×300 mm in size and 68.5 grams in weight. Both faces of each of the six sheets were spray-coated with an adhesive consisting of 21 grams (solid part) of a self-emulsifying polyisocyanate resin diluted two-fold with water.

As shown in FIG. 1, the six adhesive-coated sheets 5 were stacked with the two top sheets 5a having stalks facing the same direction, the two middle sheets 5b having stalks facing perpendicular thereto, and the two bottom sheets 5c having stalks facing perpendicular to those of the middle sheets, i.e., in the same direction as those of the top sheets 5a. As shown in FIG. 2, the stacked sheets 5 were placed between two metal plates 9 of 2 mm×350 mm×350 mm size. Spacers 6 mm in thickness were placed around the stacked sheets, then the sheets were bonded at 150° C. and 12 kg/cm² for 2 minutes with a hot press 7. The moisture was expelled from the sheets to give a laminated material 10 0.8 in specific gravity and 6 mm×300 mm × 300 mm in size.

The flexural strength of the laminated material was 483 kgf/cm²-higher than that of conventional wood based materials, such as particleboards or fiberboards and equal to or higher than that of conventional plywood for concreteforms.

EXAMPLE 2

Thirty-two sorghum stalks of the same kind as in Example 1 were split into two in the fiber direction with a knife. The stalks were continuously fed into the same nongrooved roller press as in Example 1 for compression and flattening at ordinary temperature. The wax in the epidermis of the compressed stalks was removed by sanding and then the cores were removed with a knife.

Eight sheets were formed by arranging the compressed stalks in the same manner as in Example 1. Both faces of each of the eight sheets were spray-coated with an adhesive consisting of 15 grams (solid part) of a self-emulsifying polyisocyanate resin diluted two-fold with water.

Figure 5:
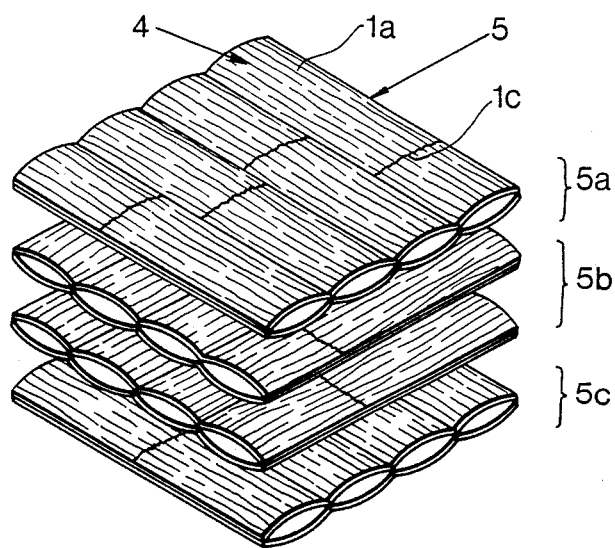
FIG. 5 is a perspective view illustrating a further way of stacking sheets according to this invention.

As shown in FIG. 5, the eight adhesive-coated sheets 5 were stacked with two top sheets 5a having stalks facing the same direction, the four middle sheets 5b having stalks facing perpendicular thereto, and the two bottom sheets 5c having stalks facing perpendicular to the stalks of the middle sheets 5b. Here, the sheets were further stacked so that the epidermis face of each sheet would oppose the core face of the adjoining sheet and vice verse, with the outer most faces of the sheets 5a and 5c being the epidermis faces.

The stacked sheets were placed between two metal plates. Spacers were placed around the stacked sheets, then the sheets were bonded at 150° C. and 12 kg/cm² for 4 minutes with the hot press. The moisture was expelled from the sheets to give a laminated material 0.8 in specific gravity and 6 mm×300 mm × 300 mm in size.

The flexural strength of the laminated material was 717 kgf/cm²-much higher than that of conventional wood based materials and equal to or higher than that of conventional structural plywood.

EXAMPLE 3

Six sheets of 1 mm×300 mm×300 mm size were formed in the same manner as in Example 2 except without removing the cores from the stalks. The two faces of each of the six sheets were spray-coated with 30 grams (solid part) of a melamine resin of 64 wt. % resin and 3 grams of an aqueous 10% NH₄Cl solution.

The six sheets were stacked in the same manner as in Example 1 and bonded in the same manner as in Example 2. A laminated material 0.53 in specific gravity and 6 mm×300mm×300 mm in size was obtained.

The laminated material had a flexural strength of 479 kgf/cm² and excellent sound absorbing and heat insulating properties in comparison with conventional wood based materials.

EXAMPLE 4

Sorghum stalks of the same kind as in Example 1 were split into two in the fiber direction with a knife. The stalks were soaked in an aqueous 0.5 % NaOH solution and then boiled for 6 hours to remove the wax of the epidermis and the core of the sorghum stalks. The stalks were flattened, spray-coated with an adhesive, arranged, and then bonded in the same manner as in Example 2.

A laminated material 0.55 in specific gravity and 6 mm×300 mm×300 mm in size was obtained. The flexural strength of the laminated material was 320 kgf/cm².

EXAMPLE 5

Four compressed stalks of sugar cane were arranged to form a sheet of 0.5 mm×300 mm×300 mm size. The two faces of 12 such sheets were spray-coated with an adhesive consisting of 25 grams (solid part) of a self-emulsifying polyisocyanate resin diluted two-fold with water and further added with 20 grams of a foaming agent.

Figure 6:
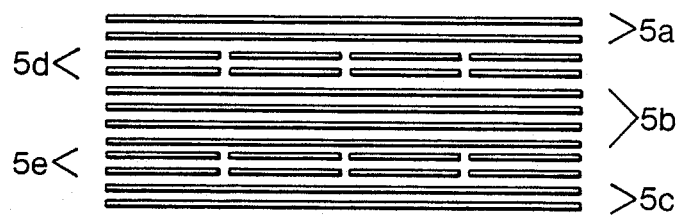
FIG. 6 is a front view illustrating a still further way of stacking sheets according to this invention.

As shown in FIG. 6, the 12 sheets were stacked with the two top sheets 5a having stalks facing the same direction, the next two sheets 5d having stalks facing perpendicular thereto, the four middle sheets 5b having stalks facing perpendicular to those of the sheets 5d, the next two sheets 5e having stalks facing perpendicular to those of the sheets 5b, and the two bottom sheets 5c having stalks again facing perpendicular thereto. Spacers of 12 mm thickness were placed around the stacked sheets, then the sheets were bonded at 150° C. and 6 kg/cm² for 4 minutes. The moisture was expelled from the sheets to give a porous laminated material 0.3 in specific gravity and 12 mm×300 mm×300 mm in size.

The laminated material had excellent sound absorbing and heat insulating properties in comparison with conventional wood based materials.

EXAMPLE 6

Four compressed stalks of corn were arranged to form a sheet of 1 mm×300 mm×300 mm size. The fourteen such sheets were soaked for two days in a solution of 230 grams (45% solid part) of a non-reactive red water-pigment uniformly dissolved in 2300 grams of water. These sheets were dried for a day in a hot air dryer to be dyed red. The two faces of each of the 14 red-colored sheets were spray-coated with an adhesive consisting of 25 grams (solid part) of a self-emulsifying polyisocyanate resin diluted two-fold with water.

The 14 sheets were stacked with the four top sheets having stalks facing the same direction, the six middle sheets having stalks facing perpendicular thereto, and the four bottom sheets having stalks again facing perpendicular thereto. Spacers of 12 mm thickness were placed around the stacked sheets, then the sheets were bonded at 150° C. and 15 kg/cm² for 4 minutes.

The moisture was expelled from the sheets to give a laminated material uniformly colored red to the inside of the fiber, 0.7 in specific gravity, and 12 mm×300 mm×300 mm in size. The laminated material had a color which did not come off even under high temperatures and humidity and did not fade even in water.

EXAMPLE 7

Two faces of the 14 sheets described in Example 6 were spray-coated with an adhesive consisting of 45% solid part of a self-emulsifying polyisocyanate resin and a urea resin. The coating quantity was 3 wt. % against the sheets as an effective component of each resin.

The 14 sheets were stacked with the three top sheets having stalks facing the same direction, the next three sheets having stalks facing perpendicular thereto, the next two middle sheets having stalks facing perpendicular thereto, the next three sheets having stalks again facing perpendicular thereto, and the three bottom sheets having stalks similarly perpendicular. Veneers, each 1 mm in thickness, were placed on the two outer most sheets with the fiber directions matching those of the sheets. Spacers of 12 mm thickness were placed around the stacked sheets, then the sheets were bonded at 150° C. and 20 kg/cm² for 4 minutes.

The moisture was expelled from the sheets to give a laminated material with veneer 0.9 in specific gravity and 12 mm×300 mm×300 mm in size. The laminated material had a flexural strength equal to or higher than that of conventional plywood and was half the price of plywood.

What is claimed is:

1. A method for the preparation of a laminated material comprising the steps of cutting open an annual lignocellulosic stalk in the fiber direction; flattening said lignocellulosic stalk by means of a roller press at pressures of from 0.5 to 10 kg/cm² to form a compressed stalk, one face of which consists of its epidermis; arranging a plurality of said compressed stalks in parallel with each other to form a sheet; coating said sheet with a resin adhesive; stacking a plurality of said sheets coated with said adhesive; and then bonding with temperatures of from room temperature to 180° C. and pressures of from 5 to 30 kg/cm².

2. The method of claim 1, wherein said sheet is formed after removing wax from the epidermis of said stalks.

3. The method of claim 1, wherein said sheet is formed before removing wax from the epidermis of said stalks.

4. The method of claim 1, wherein said sheet is formed after removing cores from said stalks.

5. The method of claim 1, wherein said sheet is formed before removing cores from said stalks.

6. The method of claim 1, wherein said sheet is formed by arranging said compressed stalks composing said sheet with the epidermis sides facing one direction.

7. The method of claim 1, wherein said resin adhesive is one or more adhesives selected from the group consisting of isocyanate adhesives, thermosetting adhesives, cold-setting adhesives, and water emulsion adhesives.

* * * * *